(12) United States Patent
Mullins et al.

(10) Patent No.: US 10,366,495 B2
(45) Date of Patent: *Jul. 30, 2019

(54) MULTI-SPECTRUM SEGMENTATION FOR COMPUTER VISION

(71) Applicant: DAQRI, LLC, Los Angeles, CA (US)

(72) Inventors: Brian Mullins, Altadena, CA (US); Nalin Senthamil, Santa Clara, CA (US); Eric Douglas Lundquist, Los Angeles, CA (US)

(73) Assignee: DAQRI, LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/880,886

(22) Filed: Jan. 26, 2018

(65) Prior Publication Data

US 2018/0150957 A1 May 31, 2018

Related U.S. Application Data

(63) Continuation of application No. 15/019,382, filed on Feb. 9, 2016, now Pat. No. 9,916,664.

(51) Int. Cl.
*G06K 9/00* (2006.01)
*G06T 7/11* (2017.01)
(Continued)

(52) U.S. Cl.
CPC ............ *G06T 7/11* (2017.01); *G06K 9/00671* (2013.01); *G06T 7/174* (2017.01); *G06T 7/194* (2017.01);
(Continued)

(58) Field of Classification Search
CPC ... G06T 7/11; G06T 7/55; G06T 7/194; G06T 7/70; G06T 7/174; G06T 11/00;
(Continued)

(56) References Cited

U.S. PATENT DOCUMENTS 5,862,517 A 1/1999 Honey
7,014,336 B1 3/2006 Ducharme et al.
(Continued)

OTHER PUBLICATIONS

"U.S. Appl. No. 15/019,382, Non Final Office Action dated Jul. 10, 2017", 10 pgs.
(Continued)

*Primary Examiner* — John B Strege
(74) *Attorney, Agent, or Firm* — Schwegman Lundberg & Woessner, P.A.

(57) ABSTRACT

A device for multi-spectrum segmentation for computer vision is described. A first optical sensor operates within a first spectrum range and generates first image data corresponding to a first image captured by the first optical sensor. A second optical sensor operates within a second spectrum range different from the first spectrum range and generates second image data corresponding to a second image captured by the second optical sensor. The device identifies a first region in the first image, maps a first portion of the first image to a second portion of the second image data, provides the second portion of the second image data to a server that generates augmented reality content based on the second portion of the second image data. The device displays the augmented reality content.

18 Claims, 12 Drawing Sheets

(51) Int. Cl.
*G06T 11/00* (2006.01)
*G06T 7/55* (2017.01)
*G06T 7/70* (2017.01)
*G06T 7/174* (2017.01)
*G06T 7/194* (2017.01)

(52) U.S. Cl.
CPC .................. *G06T 7/55* (2017.01); *G06T 7/70* (2017.01); *G06T 11/00* (2013.01); *G06T 2207/10016* (2013.01); *G06T 2207/10048* (2013.01); *G06T 2207/20112* (2013.01); *G06T 2207/30196* (2013.01)

(58) Field of Classification Search
CPC . G06T 2207/30196; G06T 2207/10016; G06T 2207/10048; G06T 2207/20112; G06K 9/00671
See application file for complete search history.

(56) References Cited

U.S. PATENT DOCUMENTS

| | | |
|---|---|---|
| 7,255,457 B2 | 8/2007 | Ducharme et al. |
| 7,572,028 B2 | 8/2009 | Mueller et al. |
| 7,959,320 B2 | 6/2011 | Mueller et al. |
| 8,100,552 B2 | 1/2012 | Spero |
| 8,478,028 B2 | 7/2013 | Hogervorst et al. |
| 8,553,981 B2 | 10/2013 | Mei et al. |
| 2009/0190003 A1* | 7/2009 | Park .......................... G06T 5/50 348/239 |
| 2012/0122491 A1* | 5/2012 | Kim ........................ H04L 67/22 455/456.3 |
| 2013/0107072 A1 | 5/2013 | Kumar et al. |
| 2013/0113830 A1* | 5/2013 | Suzuki ...................... G06T 3/00 345/634 |
| 2017/0228869 A1 | 8/2017 | Mullins et al. |

OTHER PUBLICATIONS

"U.S. Appl. No. 15/019,382, Notice of Allowance dated Oct. 25, 2017", 7 pgs.

"U.S. Appl. No. 15/019,382, PTO Response to Rule 312 Communication dated Dec. 28, 2017", 2 pgs.

"U.S. Appl. No. 15/019,382, Response filed Sep. 29, 2017 to Non Final Office Action dated Jul. 10, 2017", 12 pgs.

* cited by examiner

US 10,366,495 B2

MULTI-SPECTRUM SEGMENTATION FOR COMPUTER VISION

CLAIM OF PRIORITY

This application is a continuation of and claims the benefit of priority of U.S. application Ser. No. 15/019,382, filed Feb. 9, 2016, entitled "Multi-Spectrum Segmentation for Computer Vision", which is hereby incorporated by reference in its entirety.

TECHNICAL FIELD

The subject matter disclosed herein generally relates to image processing. Specifically, the present disclosure addresses systems and methods for multi-spectrum segmentation of an image for computer vision.

BACKGROUND

A device can be used to generate and display data in addition to an image captured with the device. For example, augmented reality (AR) is a live, direct or indirect, view of a physical, real-world environment whose elements are augmented by computer-generated sensory input such as sound, video, graphics or Global Navigation System (GPS) data. With the help of advanced AR technology (e.g. adding computer vision and object recognition) the information about the surrounding real world of the user becomes interactive. Artificial information (e.g., device-generated) about the environment and its objects can be overlaid on the real world.

The device-generated information is based on a computer vision analysis of the physical, real-world environment. Computer vision enables the device to identify and track objects. Such process is typically computer intensive because of the complexity of the analysis of the image or video. Furthermore, mobile devices have very limited computing resources.

BRIEF DESCRIPTION OF THE DRAWINGS

Some embodiments are illustrated by way of example and not limitation in the figures of the accompanying drawings.

DETAILED DESCRIPTION

Figure 1:
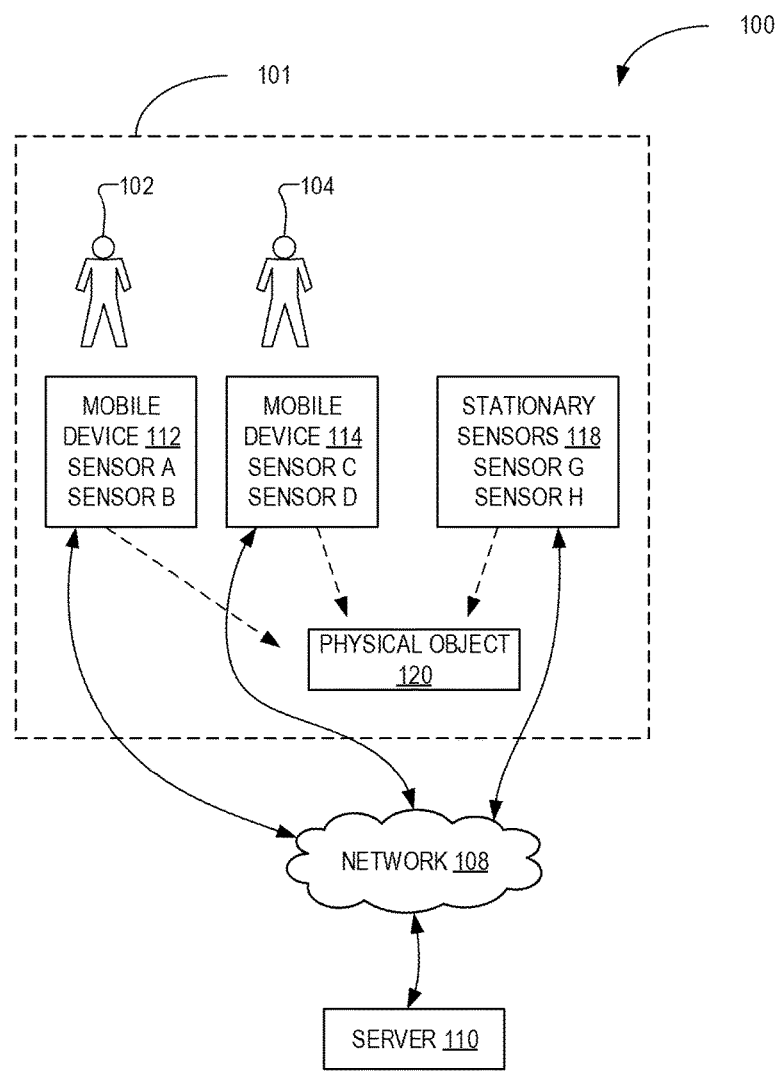
FIG. 1 is a block diagram illustrating an example of a network environment suitable for multi-spectrum segmentation, according to some example embodiments.

Example methods and systems are directed to a multi-spectrum segmentation module for an augmented reality (AR) system. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of example embodiments. It will be evident, to one skilled in the art, however, that the present subject matter may be practiced without these specific details.

AR applications allow a user to experience information, such as in the form of a virtual object (e.g., a three-dimensional model of a virtual dinosaur) overlaid on an image of a real world physical object (e.g., a billboard) captured by a camera of a viewing device. The viewing device may be or include a mobile computing device. In one example embodiment, the mobile computing device includes a handheld device such as a tablet or smartphone. In another example embodiment, the mobile computing device includes a wearable device such as a head-mounted device (e.g., helmet or glasses). The virtual object may be displayed in a transparent or clear display (e.g., see-through display) of the viewing device or a non-transparent screen of the viewing device. The physical object may include a visual reference (e.g., uniquely identifiable pattern on the billboard) that the AR application can recognize. A visualization of the additional information, such as the virtual object overlaid or engaged with an image of the physical object is generated in the display of the viewing device. The viewing device generates the virtual object based on the recognized visual reference (e.g., Quick Response (QR) code) or captured image of the physical object (e.g., image of a chair). The viewing device displays the virtual object based on a relative position between the viewing device and the visual reference. For example, a virtual dinosaur appears closer and bigger when the viewing device is held closer to the visual reference associated with the virtual dinosaur. Similarly, the virtual dinosaur appears smaller and farther when the viewing device is moved further away from the virtual reference associated with the virtual dinosaur. The virtual object may include a three-dimensional model of a virtual object or a two-dimensional model of a virtual object. For example, the three-dimensional model includes a three-dimensional view of a chair. The two-dimensional model includes a two-dimensional view of a dialog box, menu, or written information such as statistics information for a baseball player. The viewing device renders an image of the three-dimensional or two-dimensional model of the virtual object in the display of the viewing device.

The viewing device typically includes sensors such as cameras with different spectrum sensitivities (e.g., ultraviolet, visible, infrared), thermometers, infrared sensors, barometers, or humidity sensors. Those of ordinary skill in the art will recognize that other types of sensors can be included in the viewing device.

A computer processor in the viewing device can perform computer vision analysis based on the images from the different optical sensors in the viewing device pointed in the same direction. For example, the different optical sensors may be oriented and positioned in the viewing device so that they include a same or similar field of view. The field of view of the cameras may be similar when the fields of view substantially overlap. For example, the field of view of a first camera and a second camera are substantially the same when the image from the first camera overlaps the second image from the second camera by more than ninety percent.

Images with different spectrums can be analyzed using different computer vision algorithms (e.g., recognition, motion analysis, scene reconstruction, image restoration). For example, a first computer vision algorithm initially processes an image from a first camera or sensor of the viewing device with a first spectrum range to identify irrelevant portions and sweet spots. A second computer vision algorithm subsequently processes the image from a second camera (e.g., from data of both first and second camera) with a different spectrum range to identify and track objects in the relevant portions and sweet spots. By segmenting data for the algorithm (or algorithms), the performance of the algorithms can be optimized. The initial segmentation operation (with the first computer vision algorithm) may have very light processing requirements, while significantly reducing the processing volume and/or complexity of the main (second) computer vision algorithm.

For example, a computer vision device typically processes full video frames from the camera to track an image of a physical object. However, the processing of full video frames (e.g., the entire image in a frame) can be too processing intensive for a particular scenario's power constraints. The following illustrates different examples of scenarios of power constraints:

An application is attempting to track an object by using a video-based algorithm, but is unable to process the full video feed due to power limitations A separate lightweight algorithm runs on a secondary Infrared (IR) sensor that is able to identify key areas of motion in a similar or identical field of view.

To overcome the power constraint limitation, the present application describes using the output of a first computer vision algorithm (e.g., the IR algorithm) to divide the video feed from one of the cameras into smaller segments (for example, smaller time/spatial segments in terms of a combination of resolution, data compression, frame rate). A video-based algorithm (e.g., a second computer vision algorithm) is then able to process the smaller data segments of the full video feed and track the object and ignore the irrelevant portions or segments of the full video feed.

In another example embodiment, a non-transitory machine-readable storage device may store a set of instructions that, when executed by at least one processor, causes the at least one processor to perform the method operations discussed within the present disclosure.

FIG. 1 is a block diagram illustrating an example of a network environment 100 suitable for a multi-spectrum segmentation for computer vision, according to some example embodiments. The network environment 100 includes mobile devices 112, 114, stationary sensors 118, and a server 110, communicatively coupled to each other via a network 108. The mobile devices 112, 114, the stationary sensors 118, and the server 110 may each be implemented in a computer system, in whole or in part, as described below with respect to FIG. 12 or in a mobile device as described with respect to FIG. 13. The server 110 may be part of a network-based system. For example, the network-based system may be or include a cloud-based server system that provides additional information, such as three-dimensional models, to the mobile devices 112, 114.

Each mobile device 112, 114 has a respective user 102, 104. The user 102, 104 may be a human user (e.g., a human being), a machine user (e.g., a computer configured by a software program to interact with the mobile devices 112, 114), or any suitable combination thereof (e.g., a human assisted by a machine or a machine supervised by a human). The user 102 is not part of the network environment 100, but is associated with the mobile device 112 and may be a user 102, 104 of the mobile device 112. The mobile device 112 includes a computing device with a display such as a wearable computing device (e.g., helmet or glasses). In one example, the mobile device 112 includes a display screen that displays what is captured with a camera of the mobile device 112. In another example, a display of the mobile device 112 may be transparent such as in lenses of wearable computing glasses or a visor of a helmet. The mobile device 112 may be removably mounted to (e.g., worn on) a head of the user 102. In another example, other computing devices that are not head-mounted may be used instead of the mobile device 112. For example, the other computing devices may include handheld devices such as smartphones and tablet computers. Other computing devices that are not head-mounted may include devices with a transparent display such as a windshield of a car or plane.

Each mobile device 112, 114 includes a set of sensors. For example, mobile device 112 includes sensors a and b, mobile device 114 includes sensors c and d. The sensors include, for example, optical sensors of different spectrum (Ultraviolet (UV), visible, IR) or other types of sensors (e.g., audio or temperature sensor). For example, sensor a may include an IR sensor and sensor b may include a visible light sensor. Both sensors a and b are attached to the mobile device 112 and aimed in the same direction and generate a similar field of view.

Stationary sensors 118 include stationary positioned sensors g and h that are static with respect to a physical environment 101 (e.g., a room). For example, stationary sensors 118 include an IR camera on a wall or a smoke detector in a ceiling of a room. Sensors in the stationary sensors 118 can perform similar function (e.g., optical sensors) or different functions (e.g., measure pressure) from the sensors in mobile devices 112 and 114. In another embodiment, stationary sensors 118 may be used to track the location and orientation of the mobile device 112 externally without having to rely on the sensors internal to the mobile device 112. For example, the stationary sensors 118 may include optical sensors (e.g., depth-enabled 3D camera), wireless sensors (Bluetooth, wifi), GPS sensors, and audio sensors to determine the location of the user 102 with the mobile device 112, distance of the user 102 to the stationary sensors 118 in the physical environment 101 (e.g., sensors placed in corners of a venue or a room), and/or the orientation of the mobile device 112, to track what the user 102 is looking at (e.g., direction at which the mobile device 112 is pointed, mobile device 112 pointed towards a player on a tennis court, mobile device 112 pointed at a person in a room). The mobile devices 112, 114 and corresponding user 102, 104 may all be located within a same physical environment 101 (e.g., a building, a floor, a campus, a room).

The user 102 uses an AR application in the mobile device 112. The AR application provides the user 102 with an experience triggered by a physical object 120, such as a two-dimensional physical object (e.g., a picture), a three-dimensional physical object (e.g., a statue), a location (e.g., a lobby of a casino), or any references (e.g., perceived corners of walls or furniture) in the real world physical environment 101. For example, the user 102 may point the mobile device 112 towards the physical object 120 and capture an image of the physical object 120. The physical object 120 is tracked and recognized locally in the mobile device 112 using a local context recognition dataset of the AR application of the mobile device 112. The local context recognition dataset module includes a library of predefined virtual objects associated with real-world physical objects 120 or references. The AR application then generates additional information (e.g., a three-dimensional model) corresponding to the image of the physical object 120 and presents this additional information in a display of the mobile device 112 in response to identifying the recognized image. In other embodiments, the additional information may be presented to the user 102 via other means such as audio or haptic feedback. If the captured image is not recognized locally at the mobile device 112, the mobile device 112 downloads additional information (e.g., the three-dimensional model) corresponding to the captured image, from a database of the server 110 over the network 108. In another example, both mobile devices 112, 114 and the stationary sensors 118 are aimed at the same physical object 120.

In one example embodiment, the computing resources of the server 110 may be used to determine and render virtual objects based on the tracking data (generated internally with sensors from the mobile devices 112, 114 or externally with the stationary sensors 118). The rendering process of a virtual object is therefore performed on the server 110 and streamed to the mobile devices 112, 114. As such, the mobile devices 112, 114 do not have to compute and render any virtual object and may display the already rendered (e.g., previously generated) virtual object in a display of the corresponding mobile device 112, 114.

In another example embodiment, the mobile devices 112, 114 and stationary sensors 118 each may include optical sensors of different spectrum sensitivity (UV, optical, IR). In another example, the optical sensors may have overlapping spectrum range sensitivity (e.g., overlapping ranges of frequencies at which the sensors function). The server 110 may receive sensor data from all sensors a, b, c, d, g, and h from the combined devices (e.g., mobile devices 112, 114, and stationary sensors 118) and perform a computer vision process to identify and track the physical object 120. In another example embodiment, mobile device 112 receives sensor data (from sensor c or d) from mobile device 114, and sensor data (from sensor g and h) from stationary sensors 118. The mobile device 112 may perform an initial computation using data from mobile device 114 or stationary sensors 118 to filter out irrelevant portions of an image either from sensor data c, d, g, and h, or from sensor a and b. The mobile device 112 may then perform a secondary (main) computation on the remaining data (sensor data c, d, g, and h, or from sensor a and b) after the irrelevant portions have been filtered out. Data from sensors of mobile device 112, 114 and stationary sensor 118 may be mapped to each other based on their respective orientation and position relative to each other and the physical object 120.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 10 and 11. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., mobile devices 112, 114). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2A:
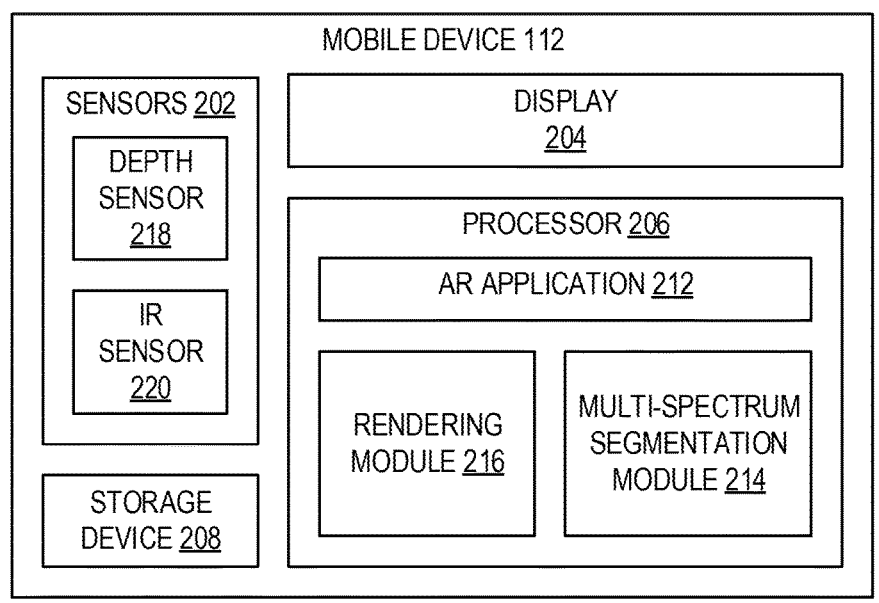
FIG. 2A is a block diagram illustrating a first example embodiment of modules (e.g., components) of a head-mounted device.

FIG. 2A is a block diagram illustrating a first example embodiment of modules (e.g., components) of the mobile device 112. The mobile device 112 may include sensors 202, a display 204, a processor 206, and a storage device 208. For example, the mobile device 112 may be a wearable computing device.

The sensors 202 include, for example, optical sensors of varying spectrum sensitivity—UV, visible, IR (e.g., depth sensor 218, IR sensor 220), a thermometer, a barometer, a humidity sensor, an EEG sensor, a proximity or location sensor (e.g, near field communication, GPS, Bluetooth, Wifi), an orientation sensor (e.g., gyroscope), an audio sensor (e.g., a microphone), or any suitable combination thereof. For example, the different optical sensors are positioned in the mobile device 112 to face a same direction. It is noted that the sensors 202 described herein are for illustration purposes and the sensors 202 are thus not limited to the ones described.

The display 204 includes, for example, a transparent display configured to display images generated by the processor 206. In another example, the display 204 includes a touch sensitive surface to receive a user input via a contact on the touch sensitive surface.

The processor 206 includes an AR application 212, a multi-spectrum segmentation module 214, and a rendering module 216. The AR application 212 receives data from the multi-segmentation module 214. The data corresponds to the physical object 120. The AR application 212 identifies the physical object 120 based on the data from the multi-segmentation module 214. The AR application 212 then retrieves, from the storage device 208, AR content associated with the physical object 120. In one example embodiment, the AR application 112 identifies a visual reference (e.g., a logo or QR code) on the physical object 120 (e.g., a chair) and tracks the location of the visual reference within the display 204 of the mobile device 112. The visual reference may also be referred to as a marker and may consist of an identifiable image, symbol, letter, number, machine-readable code. For example, the visual reference may include a bar code, a quick response (QR) code, or an image that has been previously associated with the virtual object.

The multi-spectrum segmentation module 214 receives sensor data from sensors 202. For example, the sensor data includes images and video frames from all optical sensors in different devices (e.g., mobile devices 112, 114, and stationary sensors 118). In another example, the sensor data includes data from an optical sensor with the lowest spectrum range (e.g., IR sensor 220) between the mobile devices 112, 114, and stationary sensors 118.

The multi-spectrum segmentation module 214 performs a first computer vision process to filter out irrelevant portions of the images/video frames on the sensor data from all optical sensors of different devices or sensor data from an optical sensor with the lowest spectrum range to identify irrelevant portions or segments of the image/video frames, or a sweet spot (e.g., an area or segment of interest). For example, an IR optical sensor may identify a region of interest in an image by defining a segment in the picture based on the heat contrast in the image (e.g., face of a person).

Once the multi-spectrum segmentation module 214 has segmented the picture into areas of interest, or identified irrelevant areas, the multi-spectrum segmentation module 214 identifies sensor data corresponding to areas/segments of interest based on the results of the first computer vision process. The multi-spectrum segmentation module 214 then performs a second computer vision process on the sensor data corresponding to areas/segments of interest to identify and track the physical object 120 in the segment of interest. Again, the initial segmentation operation (first computer vision process) may have very light processing requirements, while significantly reducing the processing volume and/or complexity of the main algorithm (second computer vision process). Mapping of the data between sensors 202 and the first and second computer vision processes are discussed further with respect to FIG. 3.

The rendering module 216 renders virtual objects based on data processed by AR application 212. For example, the rendering module 216 renders a display of a virtual object (e.g., a door with a color based on the temperature inside the room as detected by sensors 202 from mobile devices 112, 114 inside the room) based on a three-dimensional model of the virtual object (e.g., 3D model of a virtual door) associated with the physical object 120 (e.g., a physical door). In another example, the rendering module 216 generates a display of the virtual object overlaid on an image of the physical object 120 captured by a camera of the mobile device 112. The virtual object may be further manipulated (e.g., by the user 102) by moving the physical object 120 relative to the mobile device 112. Similarly, the display of the virtual object may be manipulated (e.g., by the user 102) by moving the mobile device 112 relative to the physical object 120.

In another example embodiment, the rendering module 216 includes a local rendering engine that generates a visualization of a three-dimensional virtual object overlaid (e.g., superimposed upon, or otherwise displayed in tandem with) on an image of a physical object 120 captured by a camera of the mobile device 112 or a view of the physical object 120 in the display 204 of the mobile device 112. A visualization of the three-dimensional virtual object may be manipulated by adjusting a position of the physical object 120 (e.g., its physical location, orientation, or both) relative to the camera of the mobile device 112. Similarly, the visualization of the three-dimensional virtual object may be manipulated by adjusting a position of the camera of the mobile device 112 relative to the physical object 120.

In another example embodiment, the rendering module 216 identifies the physical object 120 (e.g., a physical telephone) based on data from the sensors 202 (or from sensors in other devices), accesses virtual functions (e.g., increase or lower the volume of a nearby television) associated with physical manipulations (e.g., lifting a physical telephone handset) of the physical object 120, and generates a virtual function corresponding to a physical manipulation of the physical object 120.

In another example embodiment, the rendering module 216 determines whether the captured image matches an image locally stored in the storage device 208 that includes a local database of images and corresponding additional information (e.g., three-dimensional model and interactive features). The rendering module 216 retrieves a primary content dataset from the server 110, generates and updates a contextual content dataset based on an image captured with the mobile device 112.

The storage device 208 stores an identification of the sensors 202 and their respective functions from the sensor array (e.g, sensor a in mobile device 112 is an IR sensor 220, sensor b in mobile device 112 is a visible camera, sensor c in mobile device 114 is a thermometer, sensor d is UV camera). The storage device 208 may include a mapping between mobile device 112 and other devices based on their respective locations and orientations. For example, the location of the stationary sensors 118 may be predefined with respect to the physical environment 101 (e.g., located 10 feet from the south wall and 2 feet from the east wall, and oriented north). For example, an input from sensor a of mobile device 112 is mapped and corresponds to an input from sensor g from stationary sensors 118. The storage device 208 can also store the initial computer vision process and the main computer vision process. The initial computer vision process may be mapped to the main computer vision process.

The storage device 208 further includes a database of visual references (e.g., images, visual identifiers, features of images) and corresponding experiences (e.g., three-dimensional virtual objects, interactive features of the three-dimensional virtual objects). For example, the visual reference may include a machine-readable code or a previously identified image (e.g., a picture of shoe). The previously identified image of the shoe may correspond to a three-dimensional virtual model of the shoe that can be viewed from different angles by manipulating the position of the mobile device 112 relative to the picture of the shoe. Features of the three-dimensional virtual shoe may include selectable icons on the three-dimensional virtual model of the shoe. An icon may be selected or activated using a user interface on the mobile device 112.

In another example embodiment, the storage device 208 includes a primary content dataset, a contextual content dataset, and a visualization content dataset. The primary content dataset includes, for example, a first set of images and corresponding experiences (e.g., interaction with three-dimensional virtual object models). For example, an image may be associated with one or more virtual object models. The primary content dataset may include a core set of images of the most popular images determined by the server 110. The core set of images may include a limited number of images identified by the server 110. For example, the core set of images may include the images depicting covers of the ten most popular magazines and their corresponding experiences (e.g., virtual objects that represent the ten most popular magazines). In another example, the server 110 may generate the first set of images based on the most popular or often scanned images received at the server 110. Thus, the primary content dataset does not depend on objects or images scanned by the rendering module 216 of the mobile device 112.

The contextual content dataset includes, for example, a second set of images and corresponding experiences (e.g., three-dimensional virtual object models) retrieved from the server 110. For example, images captured with the mobile device 112 that are not recognized (e.g., by the server 110) in the primary content dataset are submitted to the server 110 for recognition. If the captured image is recognized by the server 110, a corresponding experience may be downloaded at the mobile device 112 and stored in the contextual content dataset. Thus, the contextual content dataset relies on the context in which the mobile device 112 has been used. As such, the contextual content dataset depends on objects or images scanned by the rendering module 216 of the mobile device 112.

In one embodiment, the mobile device 112 may communicate over the network 108 with the server 110 to retrieve a portion of a database of visual references, corresponding three-dimensional virtual objects, and corresponding interactive features of the three-dimensional virtual objects. The network 108 may be any network that enables communication between or among machines, databases, and devices (e.g., the mobile device 112). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Any one or more of the modules described herein may be implemented using hardware (e.g., a processor 206 of a machine) or a combination of hardware and software. For example, any module described herein may configure a processor 206 to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 2B:
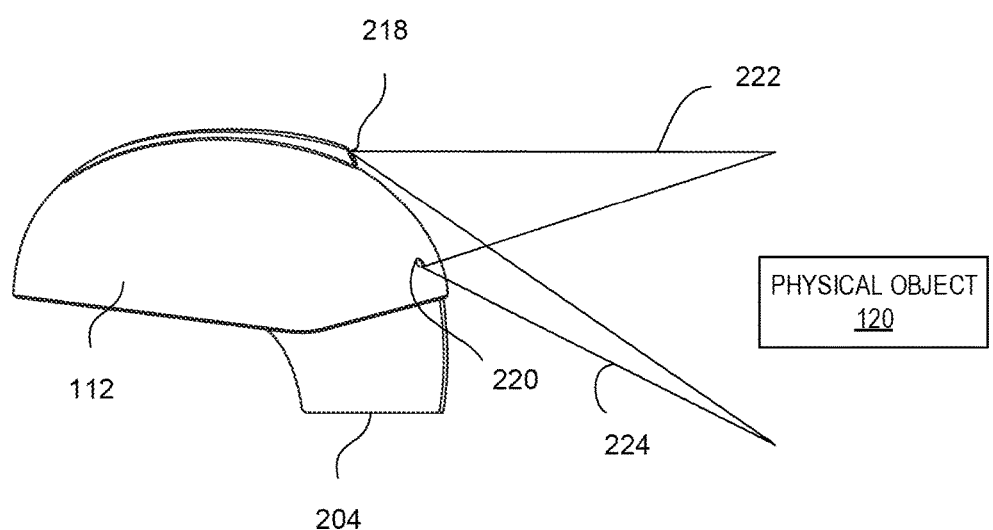
FIG. 2B is a block diagram illustrating a second example embodiment of modules (e.g., components) of a head-mounted device.

FIG. 2B is a block diagram illustrating a second example embodiment of modules (e.g., components) of the head-mounted device 112. The head-mounted device 112 includes helmet with a visor display 204. The depth sensor 218 and the IR sensor 220 are disposed in a front portion of the mobile device 112 and face a same direction. For example, both the depth sensor 218 and the IR sensor 220 capture an image of the physical object 120. The depth sensor 218 includes a field of view 222. The IR sensor 220 includes a field of view 224. Both fields of view 222 and 224 overlap.

Figure 3:
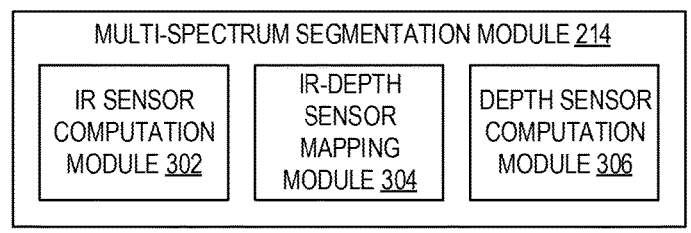
FIG. 3 is a block diagram illustrating an example embodiment of a multi-spectrum segmentation module.

FIG. 3 is a block diagram illustrating an example embodiment of the multi-spectrum segmentation module 214. The multi-spectrum segmentation module 214 includes an IR sensor computation module 302 (e.g., a trigger algorithm), an IR-depth sensor mapping module 304, and a depth sensor computation module 306. The IR sensor computation module 302 receives sensor data from IR sensor 220 (and optionally from depth sensor 218). The IR sensor computation module 302 includes an initial computer vision algorithm (first algorithm) that processes the sensor data from IR sensor 220 (and optionally from depth sensor 218), divides the image or video frame into segments or areas, and identifies segments or portions of the image that are irrelevant. The first algorithm may be a standard algorithm or a specialized version of a standard algorithm that is aware it is being used for triggered processing.

The IR-depth sensor mapping module 304 maps the computer vision algorithm from the IR sensor computation module 302 to the computer vision algorithm (second algorithm) of the depth sensor computation module 306. For example, if both algorithms are computer vision based, there would be a mapping from pixels/subsections processed in the first algorithm to pixels/subsections processed in the second algorithm. If the first algorithm is depth based and the second algorithm is computer vision based, there would be a mapping of the physical spatial area represented by the depth data from the thermal sensor to the physical spatial area represented by the pixels in the visible sensor.

The depth sensor computation module 306 processes data based on the results from the IR computation module 302. For example, the depth sensor computation module 306 tracks and identifies an object in a segment or portion of the image or video frame.

Both algorithms are being used for segmentation. For example, the first algorithm may process and provide the information required to segment and route data to the second algorithm. This optimizes the first algorithm for lower overhead and increased performance. In another example, the first algorithm may send back the raw processed data and the application logic (e.g., AR application 212 or multi-spectrum segmentation module 214) can further process that to determine the segmentation and routing of data to the second algorithm. Furthermore, the second algorithm is aware that it may receive segmented data and is optimized to perform its processing on the segment(s) of data received.

In the example of FIG. 3, two algorithms and two sensors 202 are described. The present method also works with multiple algorithms and multiple sensors 202. A scaled system provides for enhanced routing using a combination of input data and a combination of output data with associated logic for both. For example, input data from a combination of sensors 202 processed with a first algorithm to identify relevant input data corresponding to another combination of sensors 202. The relevant input data is processed with the second algorithm.

Figure 4:
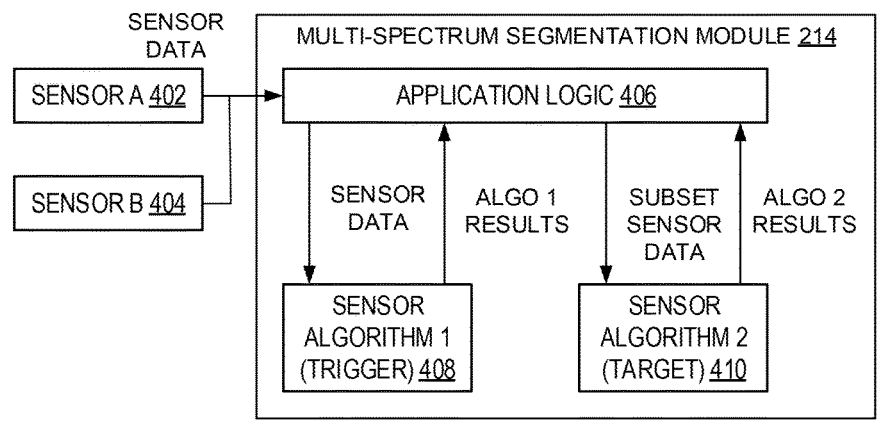
FIG. 4 is a block diagram illustrating another example embodiment of a multi-spectrum segmentation module.

FIG. 4 is a block diagram illustrating another example embodiment of the multi-spectrum segmentation module 214. The multi-spectrum segmentation module 214 receives sensor data from sensor a 402 and sensor b 404. In one example embodiment, sensor a 402 and sensor b 404 can be calibrated with respect to each other. For example, the calibration can be based on position, orientation of sensors, based on learning each sensor data independently, or based on heuristics of sensor data.

The multi-spectrum segmentation module 214 includes an application logic 406, a first sensor algorithm 408 (trigger algorithm), and a second sensor algorithm 410 (target algorithm). In one example embodiment, the multi-spectrum segmentation from different sensors may be performed at a low level such as with a field-programmable gate array (FPGA). The application logic 406 receives data from sensors a 402 and sensor b 404. The application logic 406 segments the sensor data into separate streams and routes the appropriate sensor data to the first sensor algorithm 408. The first sensor algorithm 408 processes the data sent from the application logic 406 and sends segmentation information or raw data back to the application logic 406. The application logic 406 uses the output from the first sensor algorithm 408 to map and segment incoming sensor (or any other sensor(s)) data. The application logic 406 routes the newly segmented data to the second sensor algorithm 410. The second sensor algorithm 410 processes the segmented data and sends the processed, segmented data back to the application logic 406. The application logic 406 utilizes the processed information for its intended function (e.g., analyzing the segmented portion to identify and track an object in an image).

Figure 5:
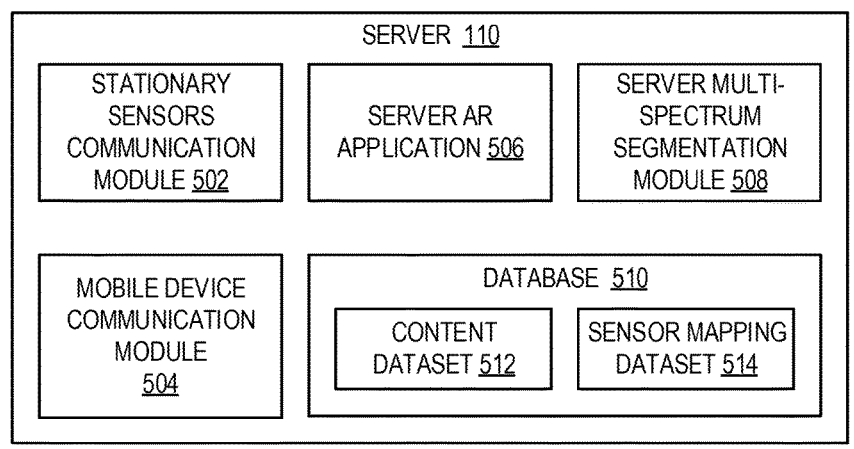
FIG. 5 is a block diagram illustrating an example embodiment of a server.

FIG. 5 is a block diagram illustrating an example embodiment of a server 110. The server 110 includes a stationary sensors communication module 502, a mobile device communication module 504, a server AR application 506, a server multi-spectrum segmentation module 508, and a database 510. The stationary sensors communication module 502 communicates, interfaces with, and accesses data from the stationary sensors 118. The mobile device communication module 504 communicates, interfaces with, and accesses data from mobile devices 112, 114.

The server multi-spectrum segmentation module 508 operates in a similar manner to multi-spectrum segmentation module 214. The server multi-spectrum segmentation module 508 performs a first computer vision process to filter out irrelevant portions of the images/video frames on sensor data received from stationary sensors communication module 502 and mobile device communication module 504. In one embodiment, the server multi-spectrum segmentation module 508 receives sensor data from an optical sensor with the lowest spectrum range to identify irrelevant portions or segments of the image/video frames, or a sweet spot (e.g., an area or segment of interest).

Once the server multi-spectrum segmentation module 508 has segmented the picture into areas of interest, or identified irrelevant areas, the server multi-spectrum segmentation module 508 identifies sensor data corresponding to areas/segments of interest (and the corresponding sensors 202) based on the results of the first computer vision process. The server multi-spectrum segmentation module 508 then performs a second computer vision process on the sensor data corresponding to areas/segments of interest to identify and track the physical object 120 in the segment of interest. Again, the initial segmentation operation (first computer vision process) may have very light processing requirements, while significantly reducing the processing volume and complexity of the main algorithm (second computer vision process). Mapping of the data between sensors 202 and the first and second computer vision processes is discussed further with respect to FIG. 3.

The database 510 stores a content dataset 512 and a sensor mapping dataset 514. The content dataset 512 may store a primary content dataset and a contextual content dataset. The primary content dataset comprises a first set of images and corresponding virtual object models. The server AR application 506 determines that a captured image received from the mobile device 112 is not recognized in the content dataset 512, and generates the contextual content dataset for the mobile device 112. The contextual content dataset may include a second set of images and corresponding virtual object models. The virtual content dataset includes models of virtual objects to be generated upon receiving a notification associated with an image of a corresponding physical object 120. The sensor mapping dataset 514 includes identification of the sensors 202 (optical sensors with different spectrum), identification of the mobile devices 112, 114, locations of the sensors 202, mapping between the sensors 202 based on their respective locations to one another and with respect to a target (physical object 120).

Figure 6:
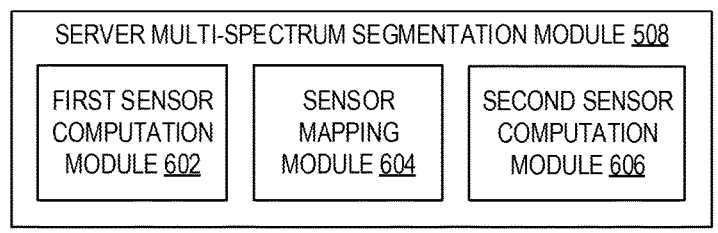
FIG. 6 is a block diagram illustrating an example embodiment of a server multi-spectrum segmentation module.

FIG. 6 is a block diagram illustrating an example embodiment of a server multi-spectrum segmentation module 608. The server multi-spectrum segmentation module 608 includes a first sensor computation module 602, a sensor mapping module 604, and a second sensor computation module 606.

The server multi-spectrum segmentation module 608 includes a first sensor computation module 602 (e.g., a trigger algorithm), a sensor mapping module 604, and a second sensor computation module 606. The first sensor computation module 602 receives sensor data from one of the optical sensor (optical sensor with the lowest or highest spectrum range among all mobile device 112 and stationary sensors 118). The first sensor computation module 602 includes an initial computer vision algorithm (first algorithm) that processes the sensor data from the first sensor 402, divides the image or video frame into segments or areas, and identifies segments or portions of the image that are irrelevant. The first algorithm may be a standard algorithm or a specialized version of a standard algorithm that is aware it is being used for triggered processing.

The sensor mapping module 604 maps the computer vision algorithm from the first sensor computation module 602 to the computer vision algorithm (second algorithm) of the second sensor computation module 606. For example, if both algorithms are computer vision based, the sensor mapping module 604 maps from pixels/subsections processed in the first algorithm to pixels/subsections processed in the second algorithm. If the first algorithm is depth based and the second algorithm is computer vision based, the sensor mapping module 604 maps the physical spatial area represented by the depth data from the thermal sensor to the physical spatial area represented by the pixels in the visible sensor.

The second sensor computation module 606 processes data based on the results from the first sensor computation module 602. For example, the second sensor computation module 606 tracks and identifies an object in a segment or portion of the image or video frame.

Figure 7:
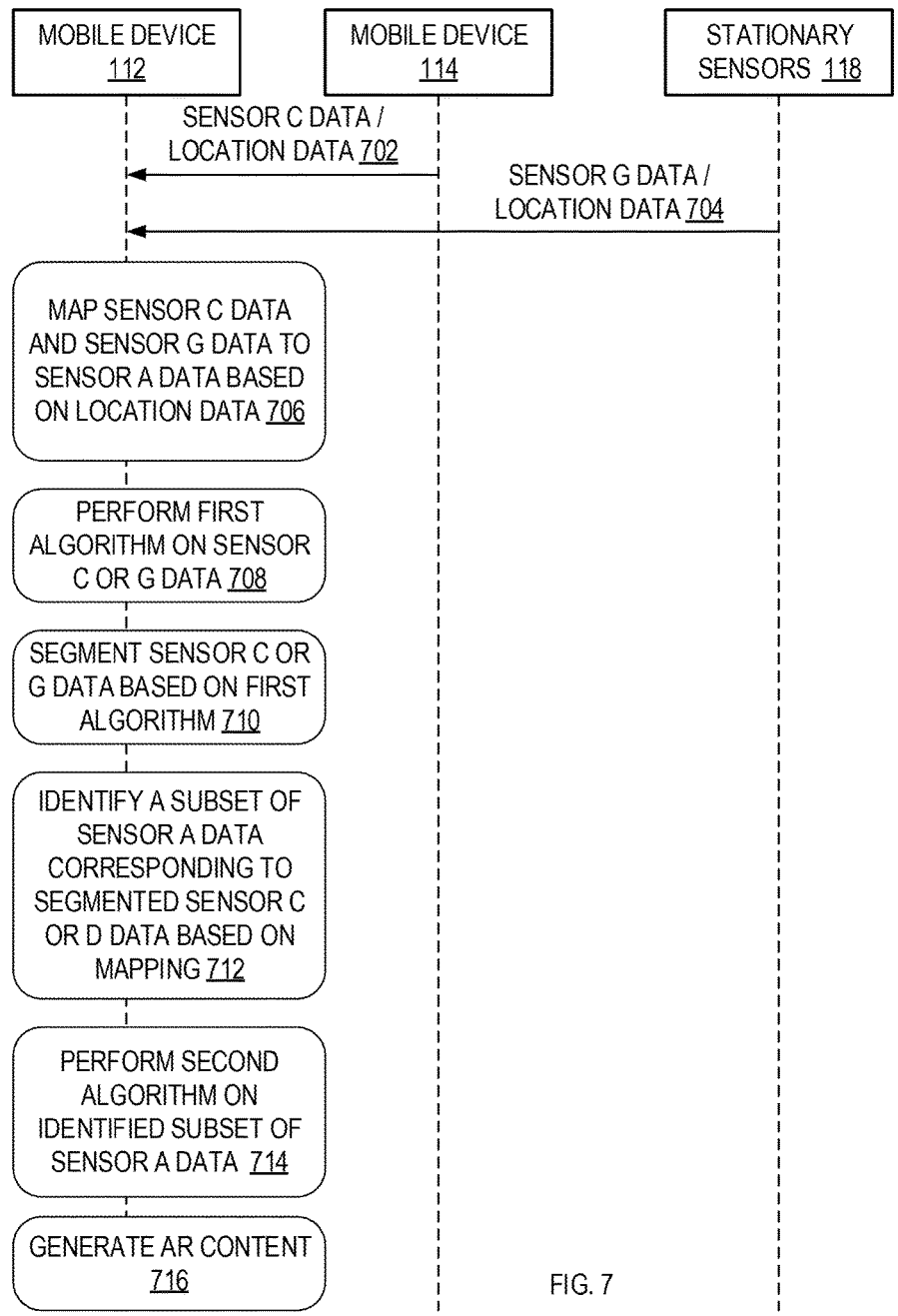
FIG. 7 is an interaction diagram illustrating a first example embodiment of an operation of a multi-spectrum segmentation module.

FIG. 7 is an interaction diagram illustrating a first example embodiment of an operation of a multi-spectrum segmentation module 214. At operation 702, mobile device 114 provides mobile device 112 with data from sensor c, and location data of the mobile device 114. At operation 704, stationary sensors 118 provide mobile device 112 with data from sensor g, and location data of the stationary sensors 118. At operation 706, mobile device 112 maps sensor c and sensor g data to sensor a data based on the location data of mobile device 114 and stationary sensors 118. At operation 708, mobile device 112 performs a fist algorithm on sensor c or g data to identify relevant and irrelevant portions. At operation 710, the mobile device 112 segments the image based on the identified relevant and irrelevant portions. At operation 712, the mobile device 112 identifies a subset of sensor a data corresponding to segmented sensor c or d data based on the mapping. At operation 714, mobile device 112 performs a second algorithm on the identified subset of sensor a data to identify and track an object of interest. At operation 716, mobile device 112 generates an AR content based on the results of the second algorithm.

Figure 8:
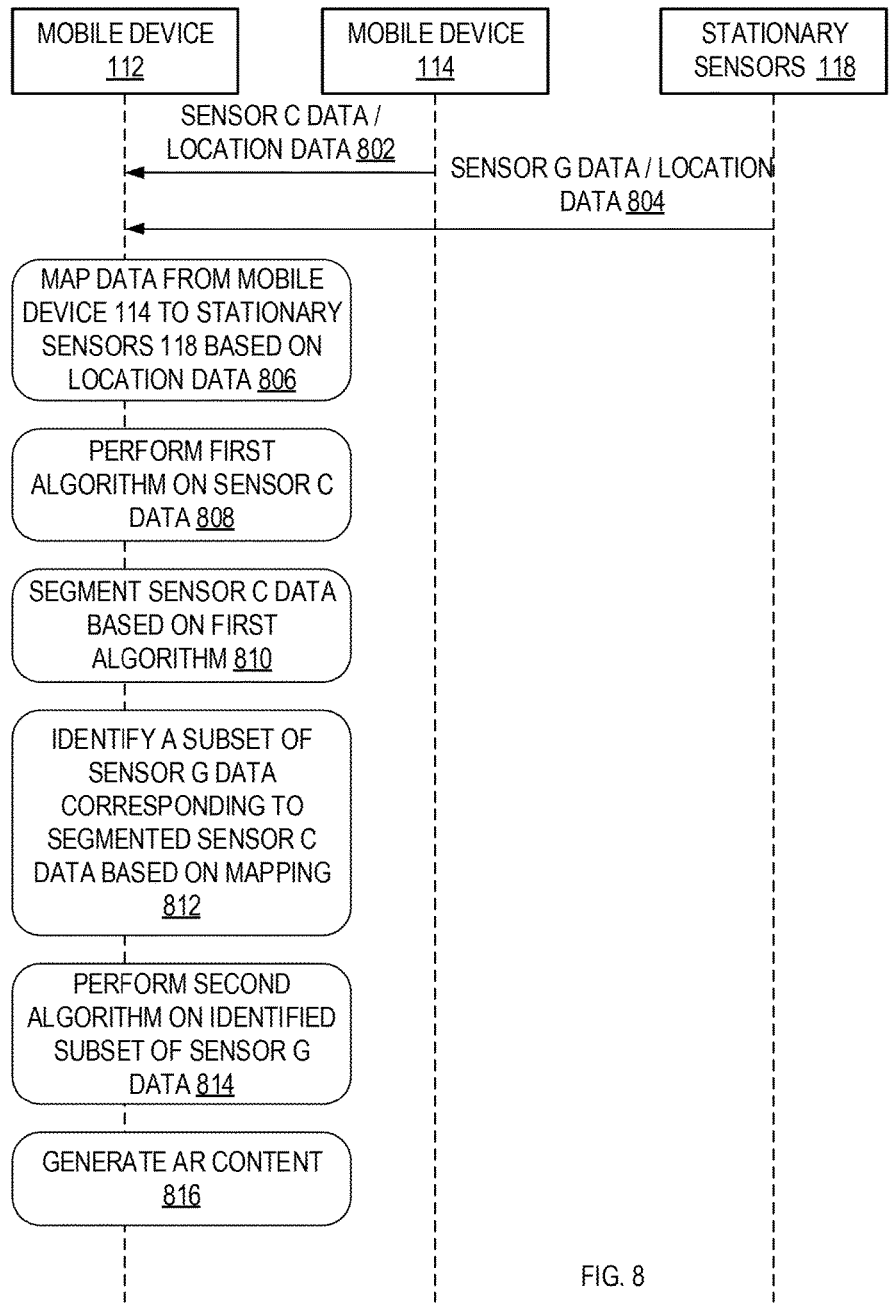
FIG. 8 is an interaction diagram illustrating a second example embodiment of an operation of a multi-spectrum segmentation module.

FIG. 8 is an interaction diagram illustrating a second example embodiment of an operation of a multi-spectrum segmentation module 214. At operation 802, mobile device 114 provides mobile device 112 with data from sensor c, and location data of the mobile device 114. At operation 804, stationary sensors 118 provide mobile device 112 with data from sensor g, and location data of the stationary sensors 118. At operation 806, mobile device 112 maps data from sensor c to sensor g from stationary sensors 118 based on the location data of mobile device 114 and stationary sensors 118. At operation 808, mobile device 112 performs a fist algorithm on data from sensor c to identify relevant and irrelevant portions. At operation 810, the mobile device 112 segments the image based on the identified relevant and irrelevant portions. At operation 812, the mobile device 112 identifies a subset of sensor g data corresponding to segmented sensor c data based on the mapping. At operation 814, mobile device 112 performs a second algorithm on the identified subset of sensor g data to identify and track an object of interest. At operation 816, mobile device 112 generates an AR content based on the results of the second algorithm.

Figure 9:
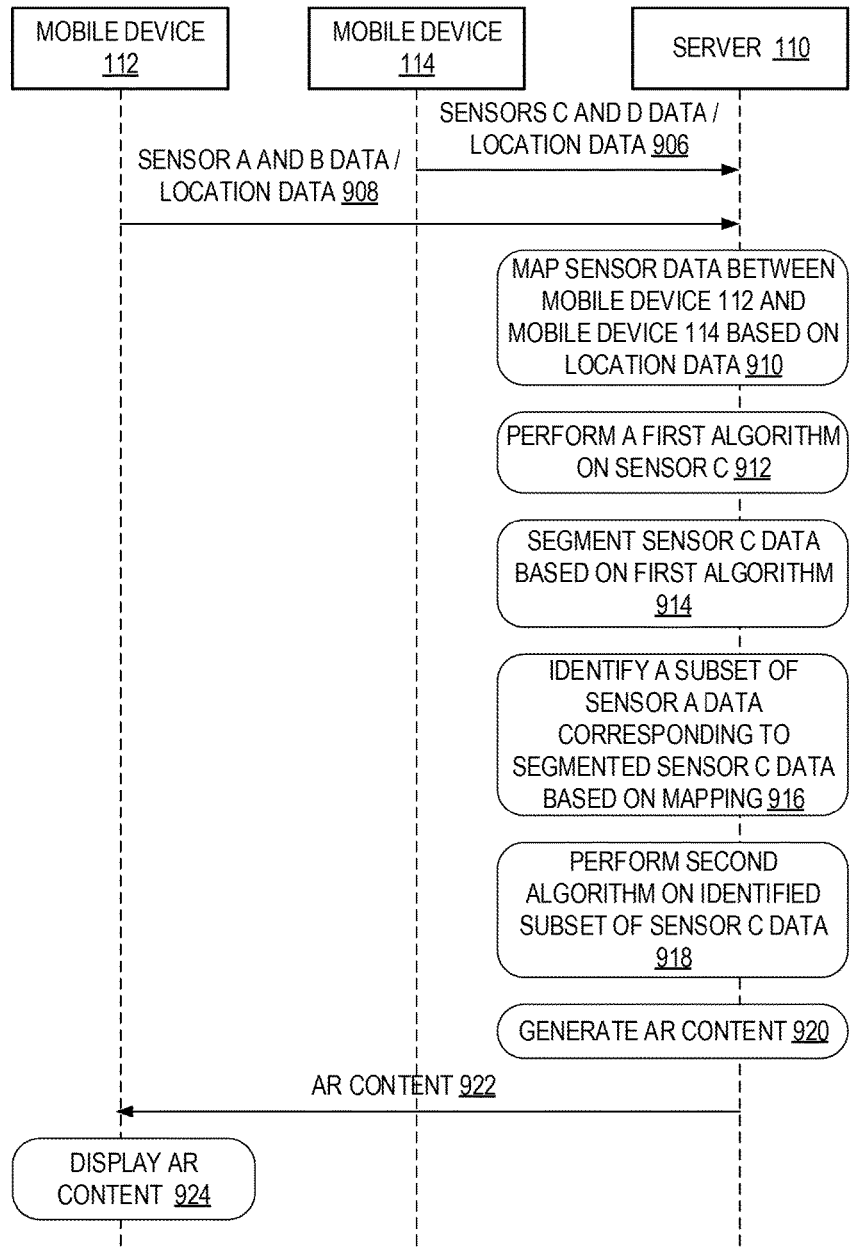
FIG. 9 is an interaction diagram illustrating a third example embodiment of an operation of a multi-spectrum segmentation module.

FIG. 9 is an interaction diagram illustrating a third example embodiment of an operation of a multi-spectrum segmentation module 214. At operation 906, mobile device 114 provides the server 110 with data from sensors c and d, and location data of the mobile device 114. At operation 908, mobile device 112 provides the server 110 with data from sensors a and b, and location data of the mobile device 112. At operation 910, the server 110 maps data between mobile device 112 and mobile device 114 based on their relative locations and orientations. At operation 912, the server 110 performs a first algorithm on data from sensor c to identify relevant and irrelevant portions. At operation 914, the server 110 segments the image based on the identified relevant and irrelevant portions. At operation 916, the server 110 identifies a subset of sensor a data corresponding to segmented sensor c data based on the mapping. At operation 918, the server 110 performs a second algorithm on the identified subset of sensor c data to identify and track an object of interest. At operation 920, the server 110 generates AR content based on the results of the second algorithm.

Figure 10:
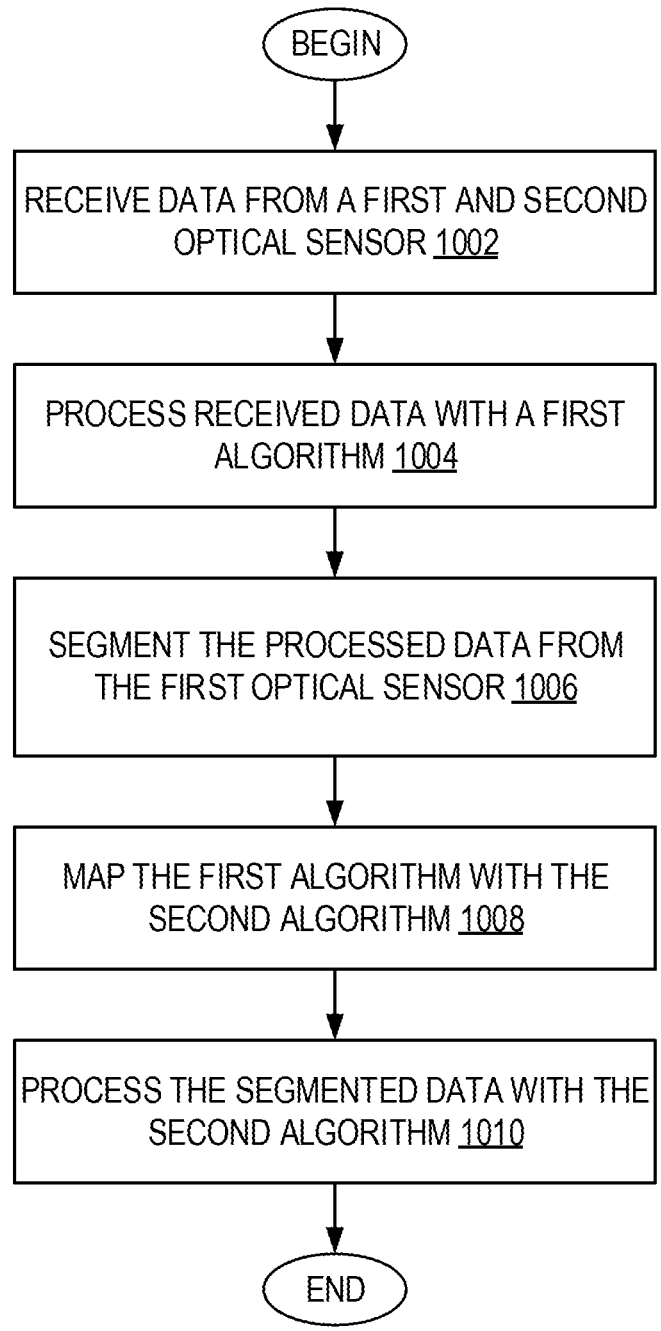
FIG. 10 is a flowchart illustrating a first example operation of a multi-spectrum segmentation module.

FIG. 10 is a flowchart illustrating a first example of an operation of the multi-spectrum segmentation module 214. At operation 1002, the multi-spectrum segmentation module 214 receives data from a first and second optical sensor having different spectrums. At operation 1004, the multi-spectrum segmentation module 214 processes the received data with a first algorithm (computer vision). At operation 1006, the multi-spectrum segmentation module 214 segments the processed data based on the results of the first algorithm. At operation 1008, the multi-spectrum segmentation module 214 maps the first algorithm to the second algorithm. At operation 1010, the multi-spectrum segmentation module 214 processes the segmented data with the second algorithm.

Figure 11:
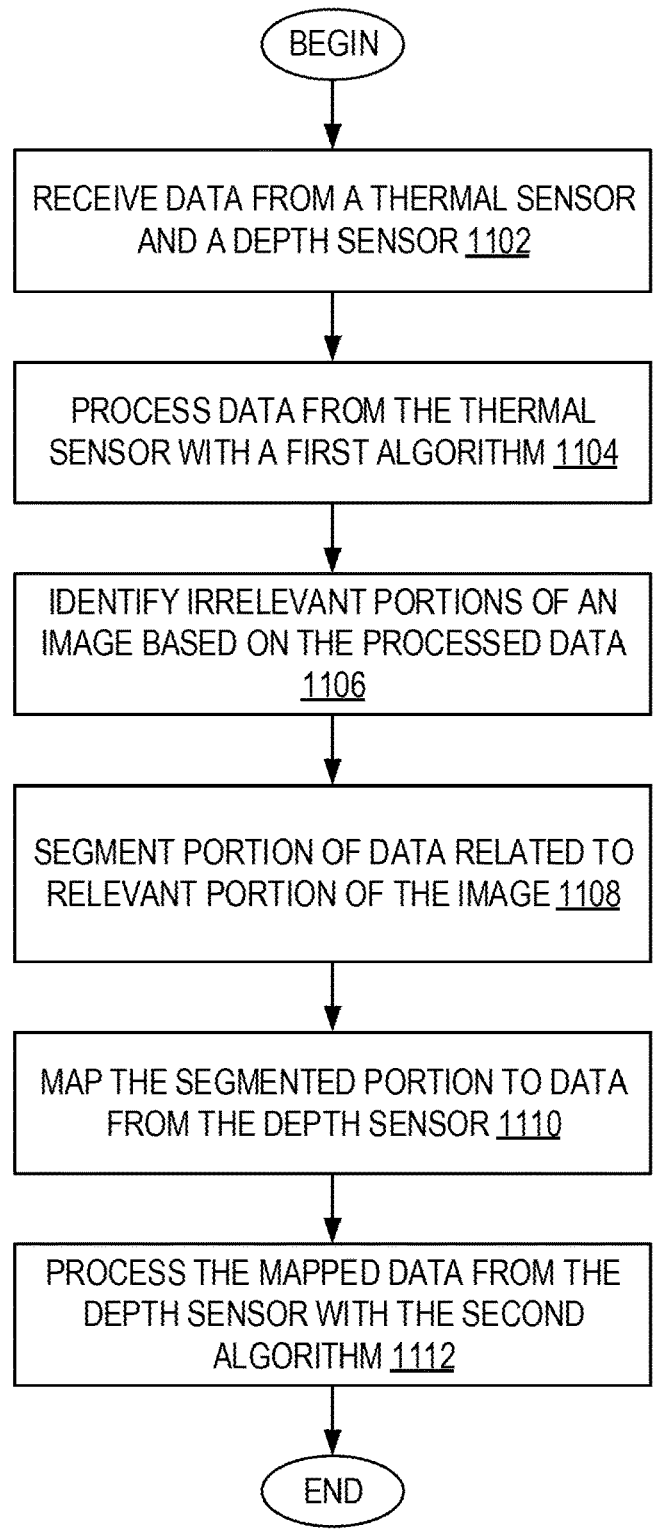
FIG. 11 is a flowchart illustrating a second example operation of a multi-spectrum segmentation module.

FIG. 11 is a flowchart illustrating a second example operation of a multi-spectrum segmentation module 214. At operation 1102, the multi-spectrum segmentation module 214 receives data from a thermal sensor. At operation 1104, the multi-spectrum segmentation module 214 processes the data from the thermal sensor with a first algorithm (computer vision). At operation 1106, the multi-spectrum segmentation module 214 identifies irrelevant portions of an image based on the processed data. At operation 1108, the multi-spectrum segmentation module 214 segments a portion of the data related to the relevant portion of the image. At operation 1110, the multi-spectrum segmentation module 214 maps the segmented portion to the data from the depth sensor. At operation 1012, the multi-spectrum segmentation module 214 processes the mapped data from the depth sensor with the second algorithm.

Example Machine

Figure 12:
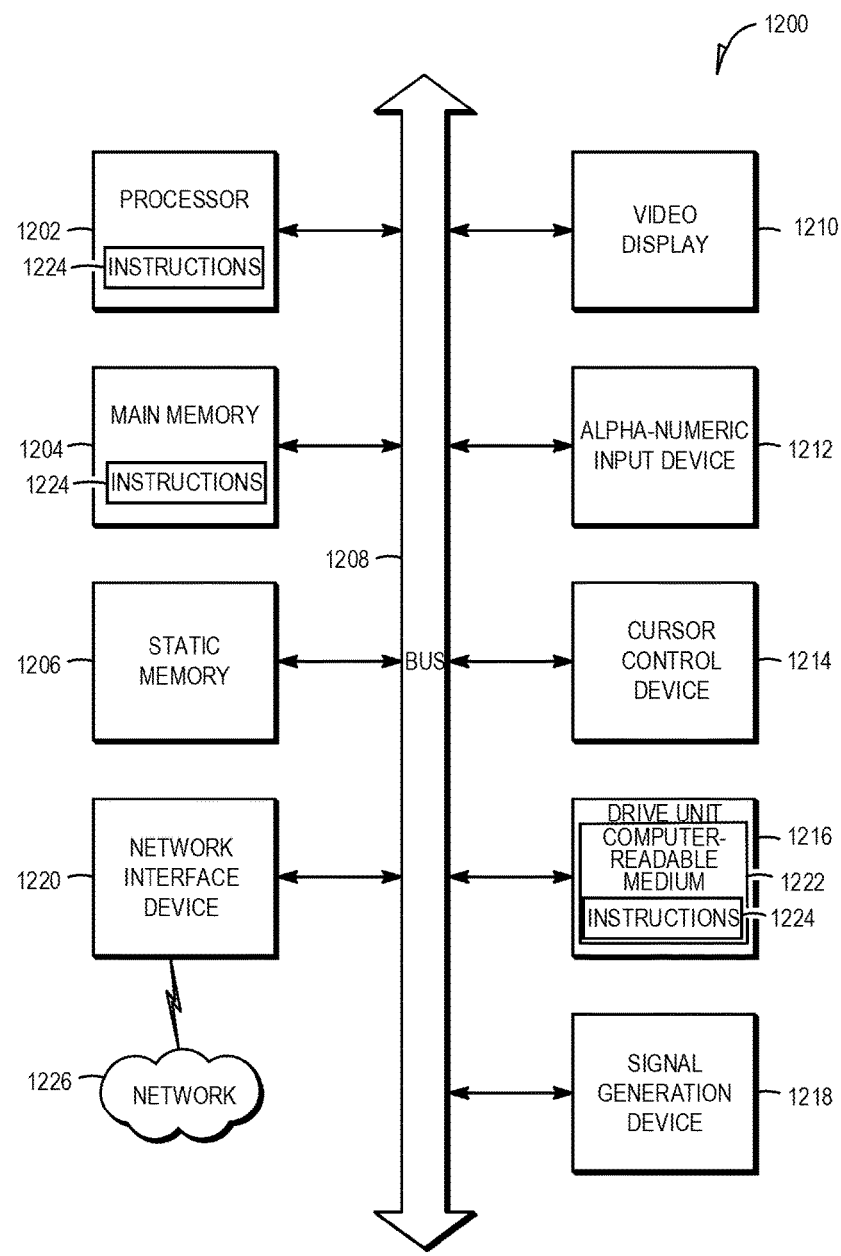
FIG. 12 is a block diagram illustrating components of a machine, according to some example embodiments, able to read instructions from a machine-readable medium and perform any one or more of the methodologies discussed herein.

FIG. 12 is a block diagram illustrating components of a machine 1200, according to some example embodiments, able to read instructions 1224 from a machine-readable medium 1222 (e.g., a non-transitory machine-readable medium, a machine-readable storage medium, a computer-readable storage medium, or any suitable combination thereof) and perform any one or more of the methodologies discussed herein, in whole or in part. Specifically, FIG. 12 shows the machine 1200 in the example form of a computer system (e.g., a computer) within which the instructions 1224 (e.g., software, a program, an application, an applet, an app, or other executable code) for causing the machine 1200 to perform any one or more of the methodologies discussed herein may be executed, in whole or in part.

In alternative embodiments, the machine 1200 operates as a standalone device or may be communicatively coupled (e.g., networked) to other machines. In a networked deployment, the machine 1200 may operate in the capacity of a server machine or a client machine in a server-client network environment, or as a peer machine in a distributed (e.g., peer-to-peer) network environment. The machine 1200 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine 1200 capable of executing the instructions 1224, sequentially or otherwise, that specify actions to be taken by that machine 1200. Further, while only a single machine 1200 is illustrated, the term "machine" shall also be taken to include any collection of machines 1200 that individually or jointly execute the instructions 1224 to perform all or part of any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The processor 1202 contains solid-state digital microcircuits (e.g., electronic, optical, or both) that are configurable, temporarily or permanently, by some or all of the instructions 1224 such that the processor 1202 is configurable to perform any one or more of the methodologies described herein, in whole or in part. For example, a set of one or more microcircuits of the processor 1202 may be configurable to execute one or more modules (e.g., software modules) described herein. In some example embodiments, the processor 1202 is a multicore CPU (e.g., a dual-core CPU, a quad-core CPU, or a 128-core CPU) within which each of multiple cores behaves as a separate processor 1202 that is able to perform any one or more of the methodologies discussed herein, in whole or in part. Although the beneficial effects described herein may be provided by the machine 1200 with at least the processor 1202, these same beneficial effects may be provided by a different kind of machine that contains no processors 1202 (e.g., a purely mechanical system, a purely hydraulic system, or a hybrid mechanical-hydraulic system), if such a processor-less machine 1200 is configured to perform one or more of the methodologies described herein.

The machine 1200 may further include a video display 1210 (e.g., a plasma display panel (PDP), a light emitting diode (LED) display, a liquid crystal display (LCD), a projector, a cathode ray tube (CRT), or any other display capable of displaying graphics or video). The machine 1200 may also include an alphanumeric input device 1212 (e.g., a keyboard or keypad), a cursor control device 1214 (e.g., a mouse, a touchpad, a trackball, a joystick, a motion sensor, an eye tracking device, or other pointing instrument), a drive unit 1216, an signal generation device 1218 (e.g., a sound card, an amplifier, a speaker, a headphone jack, or any suitable combination thereof), and a network interface device 1220.

The drive unit 1216 (e.g., a data storage device 208) includes the machine-readable medium 1222 (e.g., a tangible and non-transitory machine-readable storage medium) on which are stored the instructions 1224 embodying any one or more of the methodologies or functions described herein. The instructions 1224 may also reside, completely or at least partially, within the main memory 1204, within the processor 1202 (e.g., within the processor's cache memory), or both, before or during execution thereof by the machine 1200. Accordingly, the main memory 1204 and the processor 1202 may be considered machine-readable media 1222 (e.g., tangible and non-transitory machine-readable media). The instructions 1224 may be transmitted or received over the network 1226 via the network interface device 1220. For example, the network interface device 1220 may communicate the instructions 1224 using any one or more transfer protocols (e.g., hypertext transfer protocol (HTTP)).

In some example embodiments, the machine 1200 may be a portable computing device (e.g., a smart phone, tablet computer, or a wearable device), and have one or more additional input components 1230 (e.g., sensors 202 or gauges). Examples of such input components 1230 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components 1230 may be accessible and available for use by any of the modules described herein.

As used herein, the term "memory" refers to a machine-readable medium 1222 able to store data temporarily or permanently and may be taken to include, but not be limited to, random-access memory (RAM), read-only memory (ROM), buffer memory, flash memory, and cache memory. While the machine-readable medium 1222 is shown, in an example embodiment, to be a single medium, the term "machine-readable medium" should be taken to include a single medium or multiple media (e.g., a centralized or distributed database, or associated caches and servers 110) able to store instructions 1224. The term "machine-readable medium" shall also be taken to include any medium, or combination of multiple media, that is capable of storing the instructions 1224 for execution by the machine 1200, such that the instructions 1224, when executed by one or more processors of the machine 1200 (e.g., processor 1202), cause the machine 1200 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1224 for execution by the machine 1200 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1224).

Example Mobile Device

Figure 13:
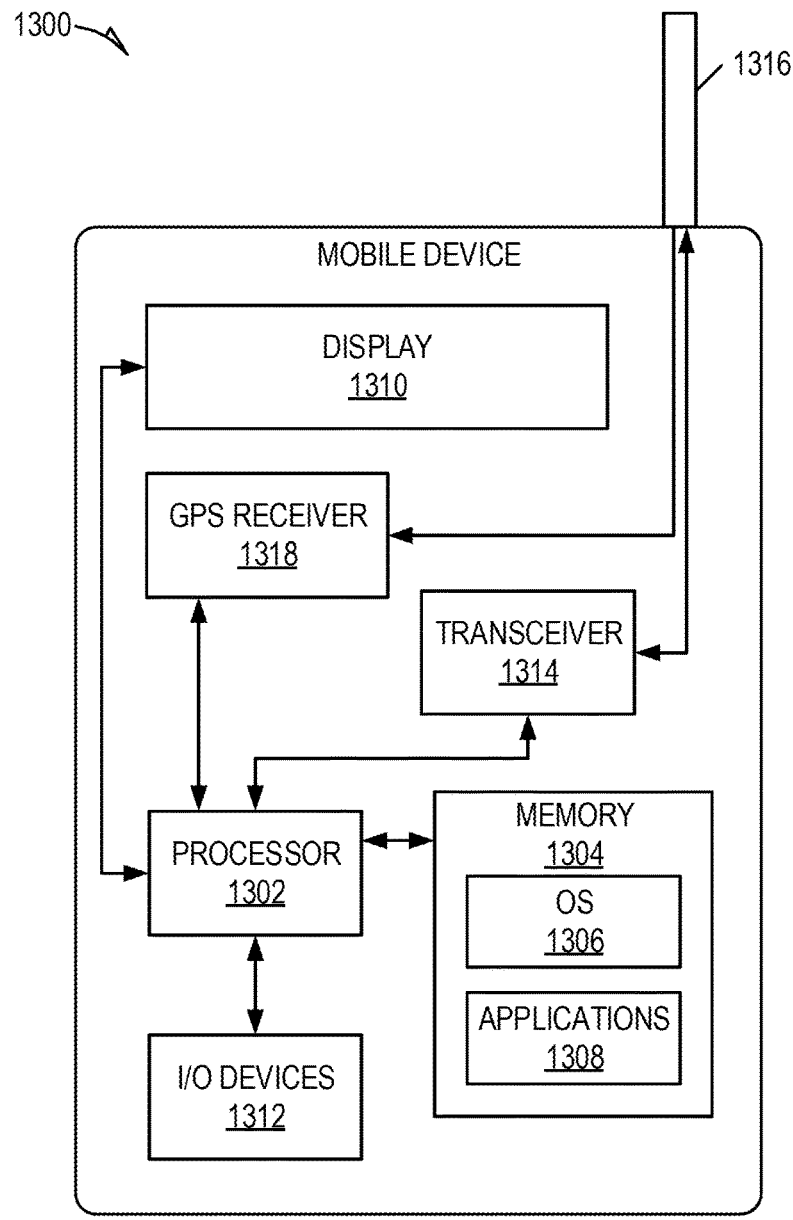
FIG. 13 is a block diagram illustrating a mobile device, according to an example embodiment.

FIG. 13 is a block diagram illustrating a mobile device 1300, according to an example embodiment. The mobile device 1300 may include a processor 1302. The processor 1302 may be any of a variety of different types of commercially available processors 1302 suitable for mobile devices 1300 (for example, an XScale architecture microprocessor, a microprocessor without interlocked pipeline stages (MIPS) architecture processor, or another type of processor 1302). A memory 1304, such as a random access memory (RAM), a flash memory, or other type of memory, is typically accessible to the processor 1302. The memory 1304 may be adapted to store an operating system (OS) 1306, as well as application programs 1308, such as a mobile location enabled application that may provide LBSs to a user 102. The processor 1302 may be coupled, either directly or via appropriate intermediary hardware, to a display 1310 and to one or more input/output (I/O) devices 1312, such as a keypad, a touch panel sensor, a microphone, and the like. Similarly, in some embodiments, the processor 1302 may be coupled to a transceiver 1314 that interfaces with an antenna 1316. The transceiver 1314 may be configured to both transmit and receive cellular network signals, wireless data signals, or other types of signals via the antenna 1316, depending on the nature of the mobile device 1300. Further, in some configurations, a GPS receiver 1318 may also make use of the antenna 1316 to receive GPS signals.

Certain example embodiments are described herein as including modules. Modules may constitute software modules (e.g., code stored or otherwise embodied in a machine-readable medium 1222 or in a transmission medium), hardware modules, or any suitable combination thereof. A "hardware module" is a tangible (e.g., non-transitory) physical component (e.g., a set of one or more processors 1302) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor 1302. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors 1302, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over suitable circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory 1304 (e.g., a memory device) to which it is communicatively coupled. A further hardware module may then, at a later time, access the memory 1304 to retrieve and process the stored output. Hardware modules may also initiate communications with input or output devices, and can operate on a resource (e.g., a collection of information from a computing resource).

The various operations of example methods described herein may be performed, at least partially, by one or more processors 1302 that are temporarily configured (e.g., by software) or permanently configured to perform the relevant operations. Whether temporarily or permanently configured, such processors 1302 may constitute processor-implemented modules that operate to perform one or more operations or functions described herein. As used herein, "processor-implemented module" refers to a hardware module in which the hardware includes one or more processors 1302. Accordingly, the operations described herein may be at least partially processor-implemented, hardware-implemented, or both, since a processor 1302 is an example of hardware, and at least some operations within any one or more of the methods discussed herein may be performed by one or more processor-implemented modules, hardware-implemented modules, or any suitable combination thereof.

Moreover, such one or more processors 1302 may perform operations in a "cloud computing" environment or as a service (e.g., within a "software as a service" (SaaS) implementation). For example, at least some operations within any one or more of the methods discussed herein may be performed by a group of computers (e.g., as examples of machines 1200 that include processors 1302), with these operations being accessible via a network 1226 (e.g., the Internet) and via one or more appropriate interfaces (e.g., an application program interface (API)). The performance of certain operations may be distributed among the one or more processors 1302, whether residing only within a single machine 1200 or deployed across a number of machines 1200. In some example embodiments, the one or more processors 1302 or hardware modules (e.g., processor-implemented modules) may be located in a single geographic location (e.g., within a home environment, an office environment, or a server farm). In other example embodiments, the one or more processors 1302 or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory 1304 (e.g., a computer memory 1304 or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine 1200. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine 1200 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A device comprising:
   a first optical sensor configured to operate within a first spectrum range and to generate first image data corresponding to a first image captured by the first optical sensor, the first optical sensor comprising a depth sensor configured to generate depth image data for the first image;
   a second optical sensor configured to operate within a second spectrum range different from the first spectrum range and to generate second image data corresponding to a second image captured by the second optical sensor;
   one or more hardware processor configured to perform operations comprising:
   identifying, from the first image data, a first region in the first image, the first region of the first image comprising corresponding depth image data that exceed a depth threshold,
   mapping a first portion of the first image data corresponding to the first region in the first image to a second portion of the second image data corresponding to a second region in the second image,
   providing the second portion of the second image data to a server configured to generate augmented reality content based on the second portion of the second image data, and
   receiving the augmented reality content from the server; and
   a display configured to display the augmented reality content.

2. The device of claim 1, wherein the identifying the first region in the first image further comprises determining that the first portion of the first image data transgress a first spectrum threshold.

3. The device of claim 2, wherein the server is configured to identify a physical object within the second region of the second image, and to generate the generated augmented reality content based on the identified physical object.

4. The device of claim 1, wherein the first optical sensor comprises an infrared sensor configured to generate infrared image data for the first image, and
   wherein the first region of the first image includes corresponding infrared image data that exceed an infrared threshold.

5. The device of claim 1, wherein the operations further comprise:
   mapping the first portion of the first image data to the second portion of the second image data based on a mapping between the first optical sensor and the second sensor, wherein the second region depicts an image of a physical object, the first region not depicting the image of the physical object; and
   identifying and tracking the physical object based on the second image data.

6. The device of claim 1, wherein the first optical sensor and the second optical sensor are configured to capture a substantially similar field of view from the device.

7. The device of claim 1, wherein the operations further comprise:
   receiving third image data from a remote device, the third image data generated with a third optical sensor of the remote device, the third optical sensor having a third spectrum range with frequencies lower than the frequencies of the second spectrum range of the second optical sensor, the third image data corresponding to a third image captured by the third optical sensor;
   identifying, from the third image data, a third region of the third image, the third region including corresponding third image data that exceed a third optical sensor threshold;
   mapping the third image data to the second image data based on relative locations between the remote device and the device, and orientation data of the remote device and the device; and
   identifying a second region of the second image based on the mapping between the third image data and the second image data, the second region of the second image corresponding to the third region of the third image.

8. The device of claim 7, wherein the operations further comprise:
   identifying and tracking a physical object depicted in the second region of the second image.

9. The device of claim 1, wherein the augmented reality content is displayed as an overlay to the physical object.

10. A method comprising:
    accessing, at a device, first image data corresponding to a first image captured by a first optical sensor of the device, the first optical sensor configured to operate within a first spectrum range, the first optical sensor comprising a depth sensor configured to generate depth image data for the first image;
    accessing at the device, second image data corresponding to a second image captured by a second optical sensor of the device, the second optical sensor configured to operate within a second spectrum range different from the first spectrum range;
    identifying, from the first image data, a first region in the first image, the first region of the first image comprising corresponding depth image data that exceed a depth threshold;
    mapping a first portion of the first image data corresponding to the first region in the first image to a second portion of the second image data corresponding to a second region in the second image;
    providing the second portion of the second image data to a server configured to generate augmented reality content based on the second portion of the second image data;
    receiving the augmented reality content from the server; and
    displaying the augmented reality content in a display of the device.

11. The method of claim 10, wherein identifying the first region in the first image further comprises determining that the first portion of the first image data transgress a first spectrum threshold.

12. The method of claim 11, further comprising:
    identifying a physical object within the second region of the second image; and
    generating the generated augmented reality content based on the identified physical object.

13. The method of claim 10, wherein the first optical sensor comprises an infrared sensor configured to generate infrared image data for the first image, and
    wherein the first region of the first image includes corresponding infrared image data that exceed an infrared threshold.

14. The method of claim 10, further comprising:

mapping the first image data to the second image data based on a mapping between the first sensor and the second sensor, wherein the second region depicts an image of a physical object, the first region not depicting the image of the physical object; and identifying and tracking the physical object based on the second image data.

15. The method of claim 10, wherein the first optical sensor and the second optical sensor are configured to capture a substantially similar field of view from the device.

16. The method of claim 10, further comprising:

receiving third image data from a remote device, the third image data generated with a third optical sensor of the remote device, the third optical sensor having a third spectrum range with frequencies lower than the frequencies of the second spectrum range of the second optical sensor, the third image data corresponding to a third image captured by the third optical sensor;

identifying, from the third image data, a third region of the third image, the third region including corresponding third image data that exceed a third optical sensor threshold;

mapping the third image data to the second image data based on relative locations between the remote device and the device, and orientation data of the remote device and the device; and identifying a second region of the second image based on the mapping between the third image data and the second image data, the second region of the second image corresponding to the third region of the third image.

17. The method of claim 16, further comprising:

identifying and tracking a physical object depicted in the second region of the second image, wherein the augmented reality content is displayed as an overlay to the physical object.

18. A non-transitory machine-readable medium comprising instructions that, when executed by one or more processors of a machine, cause the machine to perform operations comprising:

accessing at a device, first image data corresponding to a first image captured by a first optical sensor of the device, the first optical sensor configured to operate within a first spectrum range, the first optical sensor comprising a depth sensor configured to generate depth image data for the first image;

accessing at the device, second image data corresponding to a second image captured by a second optical sensor of the device, the second optical sensor configured to operate within a second spectrum range different from the first spectrum range;

identifying, from the first image data, a first region in the first image, the first region of the first image comprising corresponding depth image data that exceed a depth threshold;

mapping a first portion of the first image data corresponding to the first region in the first image to a second portion of the second image data corresponding to a second region in the second image;

providing the second portion of the second image data to a server configured to generate augmented reality content based on the second portion of the second image data;

receiving the augmented reality content from the server; and displaying the augmented reality content in a display of the device.

* * * * *